Figure 1:
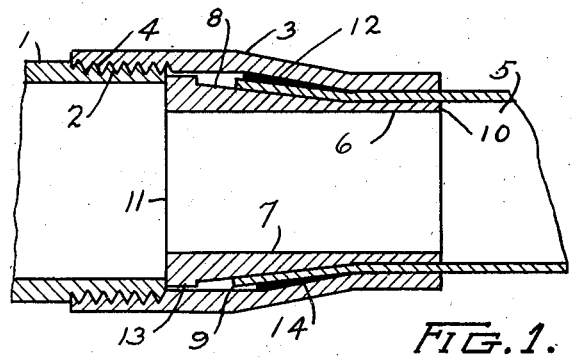

Jan. 2, 1940.	M. A. ELLIOTT	2,185,725
ADAPTER COUPLING
Filed May 12, 1938

Inventor
MORRIS AUBREY ELLIOTT.
By Howard J. Whelan.
Attorney

Patented Jan. 2, 1940

2,185,725

UNITED STATES PATENT OFFICE 2,185,725

ADAPTER COUPLING

Morris Aubrey Elliott, Baltimore, Md.

Application May 12, 1938, Serial No. 207,594

1 Claim. (Cl. 285—86)

This invention refers to couplings and more particularly to those adaptable for use with piping. It has the following list of objects: To provide a quick connection between piping; to eliminate the use of screw threads on at least one of the pieces of pipe at a joint; to enable soft piping to be joined to hard piping, and to enable the joint to become tighter as more pressure is exerted on it. Other objects will become apparent as the invention is more fully set forth.

The conventional manner of making pipe joints is by using two screw threads, one on the end of each pipe joined, and a coupling in between. In this invention, the coupling used consists of a screw threaded portion for one of the pipe ends, where the pipe is of hard and rigid material, and a special sleeve to fit into the soft pipe. The special sleeve is brought up tight and in doing so, wedges the soft pipe out and clamps it between its coupling and the sleeve.

In the construction shown in the drawing, which illustrates an embodiment of this invention—

Figure 2:
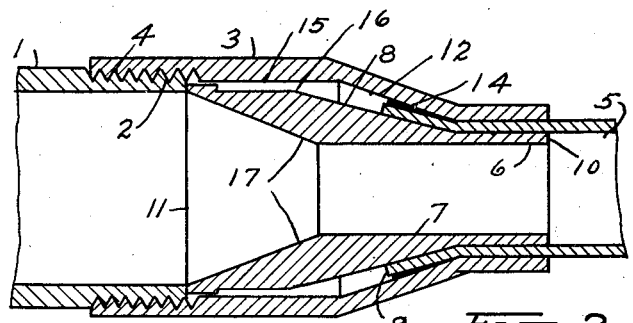
Figure 3:
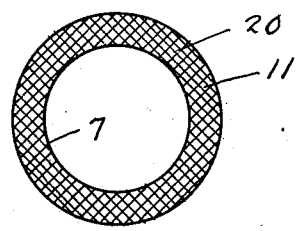

Figure 1 is a sectional view through two pieces of pipe joined by a coupling embodying this invention, Figure 2 is a modified construction of the coupling shown in Figure 1, Figure 3 shows the knurled end portion of the sleeve.

Similar reference characters refer to similar parts throughout the drawing.

In the construction shown in the drawing 1 represents a piece of rigid pipe with its end portion 2, screw threaded in the conventional way. A coupling body having an external shell 3 is interiorly screw-threaded at 4 to fit onto the screw thread portion 2, and then formed and reduced to meet the soft pipe 5 it is to join. In the view, this forming is shown made to fit a smaller pipe 5. The soft piping has a sleeve 6 inserted into it. This sleeve fits inside the exterior shell and has an interior of uniform bore 7 that is to coincide with the bore of the pipe 5, while its exterior surface 8 is gradually bevelled all around. The soft piping 5 is swaged at 9 to take the end portion 10 of the sleeve. The end portion 11 is designed to butt up against the size of pipe it is intended to join on the rigid side. The coupling body 3 is then screwed up tightly on the piping 1 until the sleeve is forced into the soft pipe its proper distance. The inside wall surface 12 of the coupling body is increased and of a slightly different angle than bevelled surface 8 of sleeve 6 to permit the wall of the soft piping to be wedged along and make a tight joint, until it meets the flange portion 13 provided on the sleeve. When it has reached this position, the soft piping has become wedged in tightly between the outside wall of the sleeve 5 and the inside wall surface of the coupling body. For use on certain rarefied gases a suitable joint compound 14 is preferably provided in between as indicated. The outside surface 11 of the flange is roughened with a knurling 20 preferred, to prevent turning of the flange and for close engagement with the pipe 1.

In the modified form shown in Figure 2, the coupling body is shaped with an additional ledge 15 against which the flat side portion 16 of the flange may come up tightly against.

In Figure 2 the passage through the sleeve is bevelled at 17 to permit a better flow, where the fitting is a reducer.

While two forms of this invention have been indicated in the drawing, it is not desired to limit this application for patent to these particular forms or in any other manner, otherwise than limited by the prior art, as it is appreciated that other forms might be made that would employ the same principles and come within the scope of the appended claim.

Having thus described the invention, what is claimed is:

A coupling of the class described for the connection of rigid and flexible pipe together comprising in combination, a shell having its rigid pipe end interior portion attachable and adjustable on rigid pipe and its flexible pipe end interior portion restricted in diameter to engage on the exterior peripheral surface of the flexible pipe for an appreciable distance, and the middle interior portion of the shell being tapered and enlarged from the flexible to the rigid pipe portion for enlarging the flexible pipe therein, and a thimble in the shell, and spaced therefrom for engagement with the interior of the flexible pipe and for pressing same against the shell surface, said shell having its end portion straight for an appreciable distance to conform with that of the shell and a tapered middle portion to conform with that of the said middle portion, said thimble having an extending flange at its rigid pipe portion adapted to come adjacent the walls of the shell and with knurling on its transverse face arranged to engage with the end face of the rigid pipe and lock thereon, substantially as described.

MORRIS AUBREY ELLIOTT.